No. 768,958. Patented August 30, 1904.

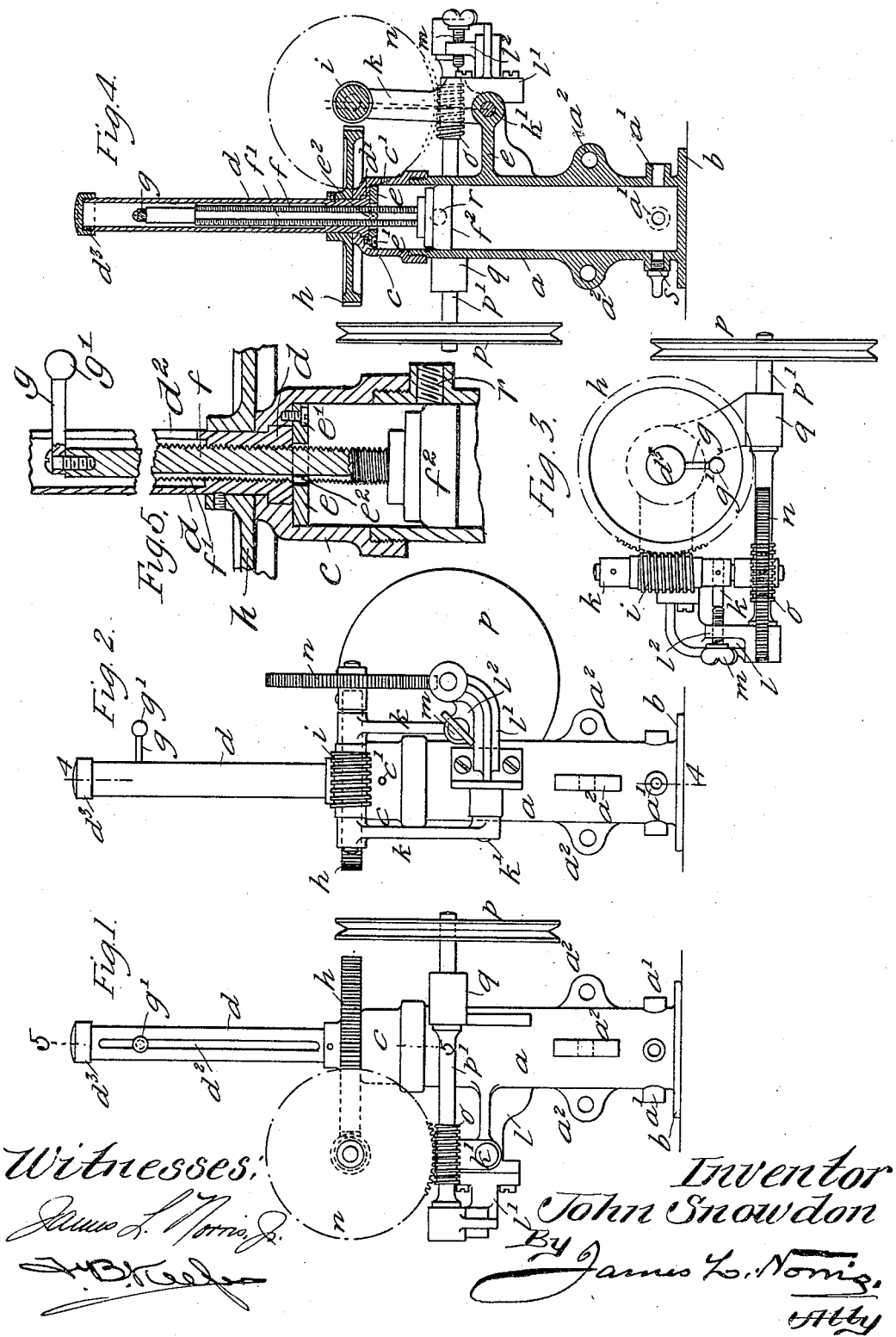

UNITED STATES PATENT OFFICE.

JOHN SNOWDON, OF MILLWALL, ENGLAND.

AUTOMATIC LUBRICATOR.

SPECIFICATION forming part of Letters Patent No. 768,958, dated August 30, 1904.

Application filed September 14, 1903. Serial No. 173,176. (No model.)

*To all whom it may concern:*

Be it known that I, JOHN SNOWDON, engineer, a subject of the King of Great Britain and Ireland, residing at Lowes Wharf, Millwall, in the county of London, England, have invented certain new and useful Improvements in Automatic Lubricators, of which the following is a specification, for which I have applied for a patent in Great Britain, dated May 28, 1903, No. 12,219.

This invention relates to lubricating apparatus of the kind in which the lubricant is expelled under pressure from a container by a mechanically-driven piston working therein and is applicable for use where the piston is operated by a high-speed motor.

In the accompanying drawings, Figures 1 and 2 are elevations at right angles to one another, and Fig. 3 is a plan of a lubricator constructed according to the present invention. Fig. 4 is a section on line 4 4 of Fig. 2; and Fig. 5 is a part section, drawn to an enlarged scale, on line 5 5 of Fig. 1.

A cylinder $a$, of brass or other suitable material, is closed at one end where it has a flange $b$ and at the other end by a cap $c$, screwed on the cylinder. This cylinder is provided with a piston $f^2$, the screw-threaded piston-rod $f$ of which extends upward into a tube $d$, secured to the top of the cylinder $a$ by the cap $c$. The lower end of the tube $d$, which is screw-threaded internally, is provided with a collar $d'$, which fits into a corresponding shoulder inside the cap $c$. The collar $d'$ is held with freedom up against this shoulder by a washer $e$, which is fixed to the cap by set-screws $e'$ and is provided with a projection $e^2$ on its internal periphery. The projection normally engages in a groove $f'$ in the screw-threaded rod $f$, which carries at its lower end the piston $f^2$. When the tube $d$ is rotated in the journal formed by the shoulder in the cap $c$ and the washer $e$, the rod $f$, which is screw-threaded to fit the internal thread of the tube, is compelled to move longitudinally in the direction of its own axis, being prevented from turning by the projection $e^2$, engaged in the groove $f'$. Pivotally attached to the upper end of the rod $f$ and extending therefrom through a slot $d^2$ in the tube $d$ is a pin $g$, surmounted by a knob $g'$. The upper end of the tube $d$ is closed by a cap $d^3$, screwed thereon.

At the bottom of the cylinder are provided one or more orifices $a'$, to which may be conveniently attached pipes leading to the various surfaces to be lubricated. Cast in one with or otherwise attached to the cylinder are two or more lugs $a^2$, provided with holes by which the lubricator may be fixed to a supporting-bracket. A convenient arrangement is to have two pairs of lugs so disposed that the lubricator can be fixed in either of two positions at right angles to each other. The lubricator may also be fixed to a base by screws through the flange $b$.

Fixed to the tube $d$ by set-screws is a worm-wheel $h$, gearing with a worm $i$, the shaft of which is journaled in the upper ends of two arms $k$ $k$, the lower ends of which are fixed to a rocking shaft $k'$. This rocking shaft is journaled in a bracket $l$, which is cast in one piece with or otherwise fixed to the cylinder $a$ and which also carries an arm $l'$, in which is journaled one end of the spindle of the driving-wheel $p$. The end of a screw $m$, which works in a snug $l^2$ on the arm $l'$, can be made to abut on one of the arms $k$, and thus hold the worm $i$ in engagement with its wheel $h$. By unscrewing $m$ the frame carrying the worm $i$ can be rocked outward, so as to disengage the latter from its wheel, as shown in Fig. 4. Fixed to the shaft of the worm $i$ is another worm-wheel $n$, gearing with worm $o$ on the spindle $p'$ of the driving-wheel $p$. A second bearing for the driving-shaft $p'$ is provided in another bracket $q$, cast on the cylinder. Near the upper end of the cylinder is provided an internally-threaded orifice $r$ for the attachment of a pipe through which lubricant may be forced into the cylinder when it requires replenishing. Screw-plugs $s$ are provided for the purpose of closing any of the orifices $a'$ $r$ when not in use. The wheel $p$ is driven by a belt from any suitable rotating part of the machinery to which the lubricator is attached or by any other means which may be convenient and drives, through worm-gearing $o$ $n$ and $i$ $h$ and the screw-threaded tube $d$, the screw-threaded rod $f$, to which the piston is attached, and thus maintains the pressure required to force the lubricant to the various surfaces.

When the cylinder is exhausted of lubricating material, the piston $f^2$ has then reached such a position that the thread of the rod $f$, which does not extend to the end of the latter, is clear of the thread of the tube $d$, and further motion of the piston is impossible. The quantity of lubricant in the cylinder is indicated by the position of the knob $g'$. When it is desired to recharge the cylinder, the worm $i$ is first thrown out of gear with its wheel. Then by pulling the knob $g'$ upward to raise the rod $f$ and turning the tube $d$ in the reverse direction to that in which it is driven by the feeding mechanism the screw-thread of the rod $f$ is brought into engagement with the thread of the tube $d$, so that by continuing the reverse rotation of the latter the piston may be quickly raised to its upper limit, at which it is clear of the orifice $r$, a small hole $c'$ in the cap $c$ allowing the air to escape, and the lubricant may then be forced into the cylinder.

Having thus described the nature of this invention and the best means I know of carrying the same into practical effect, I claim—

1. An automatic lubricator comprising a reservoir adapted to contain a lubricant and provided with an outlet, a piston operating in the reservoir and provided with a piston-rod having a portion of its length screw-threaded, an internally-screw-threaded tube gearing with said rod for operating it, said rod adapted to be automatically disconnected from said tube when the lubricant has been exhausted from the reservoir, means for elevating said rod so as to cause the screw-threads thereof to engage with the screw-threads of the tube, a worm-wheel fixed to said tube and adapted when operated to rotate the tube causing thereby the operation of said piston until the lubricant is exhausted, a bracket connected with the reservoir, a rock-shaft journaled in the bracket, a pair of arms carried by said rock-shaft, a worm-shaft journaled in said arms and engaging and operating said worm-wheel, a worm-wheel carried by said worm-shaft for operating it, a worm-shaft operated by a prime mover and engaging with and operating the worm-wheel on the first-mentioned worm-shaft, and supporting means for said worm-shaft operated by the prime mover.

2. An automatic lubricator comprising a reservoir adapted to contain a lubricant and provided with an outlet, a piston operating in the reservoir and provided with a piston-rod having a portion of its length screw-threaded, an internally-screw-threaded tube gearing with said rod for operating it, said rod adapted to be automatically disconnected from said tube when the lubricant has been exhausted from the reservoir, means for elevating said rod so as to cause the screw-threads thereof to engage with the screw-threads of the tube, a worm-wheel fixed to said tube and adapted when operated to rotate the tube causing thereby the operation of said piston until the lubricant is exhausted, a bracket connected with the reservoir, a rock-shaft journaled in the bracket, a pair of arms carried by the said rock-shaft, a worm-shaft journaled in said arms and engaging and operating said worm-wheel, a worm-wheel carried by said worm-shaft for operating it, a worm-shaft operated by a prime mover and engaging with and operating the worm-wheel on the first-mentioned worm-shaft, an extension carried by said bracket, and an arm carried by the reservoir, said extension and said last-mentioned arm forming a supporting means for the worm-shaft operated by the prime mover.

In testimony whereof I have signed my name to this specification in the presence of two subscribing witnesses.

JOHN SNOWDON.

Witnesses:
WALTER J. SKERTEN,
EDWARD GARDNER.